(12) United States Patent
Hubert et al.

(10) Patent No.: US 12,197,110 B2
(45) Date of Patent: Jan. 14, 2025

(54) LENS HOLDER TO COMPENSATE FOR OPTICAL FOCAL SHIFT BY THERMO-MECHANICAL EXPANSION

(71) Applicant: Apple Inc., Cupertino, CA (US)

(72) Inventors: Aurelien R. Hubert, Saratoga, CA (US); Chaitali N. Dalvi, Cupertino, CA (US); Justan Forsyth, Tuscon, AZ (US); Regis R. Tessieres, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 16/830,117

(22) Filed: Mar. 25, 2020

(65) Prior Publication Data

US 2020/0310227 A1 Oct. 1, 2020

Related U.S. Application Data

(60) Provisional application No. 62/826,673, filed on Mar. 29, 2019.

(51) Int. Cl.
*G02B 7/02* (2021.01)
*G02B 7/00* (2021.01)
(Continued)

(52) U.S. Cl.
CPC ............ *G03B 17/12* (2013.01); *G02B 7/008* (2013.01); *G02B 7/021* (2013.01); *G02B 7/025* (2013.01);
(Continued)

(58) Field of Classification Search
None
See application file for complete search history.

(56) References Cited

U.S. PATENT DOCUMENTS 4,855,987 A    8/1989   Versluis
5,146,367 A    9/1992   Newman
(Continued)

FOREIGN PATENT DOCUMENTS

CN    102449524 A    5/2012
CN    103257428    8/2013
(Continued)

OTHER PUBLICATIONS

Title: Translation of JP2016-218139 Author: Hirata et al. Date: Dec. 22, 2016 (Year: 2016).*

(Continued)

*Primary Examiner* — Twyler L Haskins
*Assistant Examiner* — Wesley J Chiu
(74) *Attorney, Agent, or Firm* — Robert C. Kowert; Kowert, Hood, Munyon, Rankin & Goetzel, P.C.

(57) ABSTRACT

A camera module includes a lens assembly, a lens holder, and an image sensor assembly. The lens assembly includes a lens barrel and multiple lens elements embedded within the lens barrel. A change of temperature causes an optical focal shift that is determined according to an optical thermal shift rate associated with an optical design of the lens assembly. The lens holder has a lens holder CTE to compensate for the optical focal shift by thermo-mechanical expansion. The change of temperature causes a length expansion of the lens holder determined at least in part according to the lens holder CTE. The image sensor assembly includes an image sensor and a substrate coupled to the image sensor, the image sensor to capture light passing through the multiple lens elements and convert the captured light into image signals. The lens holder is attached to the lens barrel and the substrate using adhesives.

17 Claims, 12 Drawing Sheets

(51) Int. Cl.
  *G03B 17/06* (2021.01)
  *G03B 17/08* (2021.01)
  *G03B 17/12* (2021.01)
  *H04N 23/55* (2023.01)
  *H04N 23/57* (2023.01)

(52) U.S. Cl.
  CPC ............ *G02B 7/028* (2013.01); *G03B 17/06* (2013.01); *G03B 17/08* (2013.01); *H04N 23/55* (2023.01); *H04N 23/57* (2023.01)

(56) References Cited

U.S. PATENT DOCUMENTS

| | | | |
|---|---|---|---|
| 9,594,228 | B1 | 3/2017 | Feng |
| 9,876,996 | B2 | 1/2018 | Campbell et al. |
| 2002/0181128 | A1 | 12/2002 | Beattie |
| 2005/0168846 | A1 | 8/2005 | Ye et al. |
| 2006/0023107 | A1 | 2/2006 | Bolken et al. |
| 2006/0290802 | A1* | 12/2006 | Webster ............... H04N 5/2253 348/340 |
| 2010/0157143 | A1* | 6/2010 | Kim ..................... H04N 5/2257 348/374 |
| 2012/0019940 | A1 | 1/2012 | Lu et al. |
| 2014/0211009 | A1* | 7/2014 | Fursich ................. G02B 13/04 348/148 |
| 2016/0097912 | A1* | 4/2016 | Kobori ................ H04N 5/2254 359/820 |
| 2016/0227095 | A1* | 8/2016 | Yoshizawa ............ G03B 17/38 |
| 2016/0295081 | A1 | 10/2016 | Graff |
| 2017/0045708 | A1* | 2/2017 | Campbell ............. G03B 17/12 |
| 2017/0059807 | A1 | 3/2017 | Feng |
| 2017/0276895 | A1 | 9/2017 | Sakuma et al. |
| 2017/0363835 | A1 | 12/2017 | Takama et al. |
| 2018/0176451 | A1 | 6/2018 | Asuncion |
| 2019/0004276 | A1 | 1/2019 | Tabuchi |
| 2019/0033551 | A1 | 1/2019 | Huang et al. |
| 2019/0052779 | A1* | 2/2019 | Taylor .................... H04N 23/54 |
| 2019/0196134 | A1* | 6/2019 | Yuan ..................... G02B 7/028 |
| 2019/0278048 | A1 | 9/2019 | Kanzaki |
| 2020/0064582 | A1* | 2/2020 | Nakajima .............. G02B 7/021 |
| 2020/0099837 | A1* | 3/2020 | Diesel ................... G02B 7/021 |
| 2021/0191064 | A1* | 6/2021 | Imai ....................... G03B 17/02 |
| 2021/0306530 | A1* | 9/2021 | Wang .................... H04N 5/2253 |

FOREIGN PATENT DOCUMENTS

| | | |
|---|---|---|
| CN | 107278277 A | 10/2017 |
| CN | 208076805 | 11/2018 |
| JP | 2016218139 A | * 12/2016 |

OTHER PUBLICATIONS

Title: "Overview of materials for Polycarbonate, Molded" Web: https://web.archive.org/web/20110101132957/https://www.matweb.com/search/DataSheet.aspx?MatGUID=84b257896b674f93a39596d00d999d77 (Year: 2011).*

Title: "Overview of materials for Polypropylene, Extrusion Grade" Web: https://web.archive.org/web/20110101144631/https://www.matweb.com/search/DataSheet.aspx?MatGUID=a882a1c603374e278d062f106dfda95b (Year: 2011).*

Title: "Overview of materials for Polypropylene, Molded" Web: https://web.archive.org/web/20110101071356/https://www.matweb.com/search/DataSheet.aspx?MatGUID=08fb0f47ef7e454fbf7092517b2264b2 (Year: 2011).*

European Search Report and Written Opinion from Application No. 20166423.2-1020, dated Aug. 26, 2020, pp. 1-10.

Office action from Japanese Application No. 2020-059850, dated Jun. 3, 2021, (English translation and Japanese Version), pp. 1-4.

Office action from Chinese Application No. 202010229121.9, dated May 7, 2021, (English translation and Chinese version), pp. 1-39.

Jeremy Huddleston et al, "Comparison of the thermal effects on LWIR optical designs utilizing different infrared optical materials", Proceedings of SPIE, vol. 9070, May 2014, pp. 1-12.

Raghad Ismail Ibrahim, "Graphically Selected Optical Material for Color Correction and Passive Athermalization", Journal of Engineering Research and Applications ISSN: 2248-9622, vol. 6, Issue 4, (Part-5) dated Apr. 2016, pp. 38-41.

Office Action mailed Dec. 15, 2021 in Chinese Patent Application No. 202010229121.9, Apple Inc., pp. 1-25 (with translation).

Notice of Allowance mailed Mar. 29, 2022 in Chinese patent application No. 202010229121.9, Apple Inc., pp. 1-7 (including translation).

Office Action from Chinese Patent Application No. 202210607990.X, dated Apr. 25, 2024, pp. 1-12.

* cited by examiner

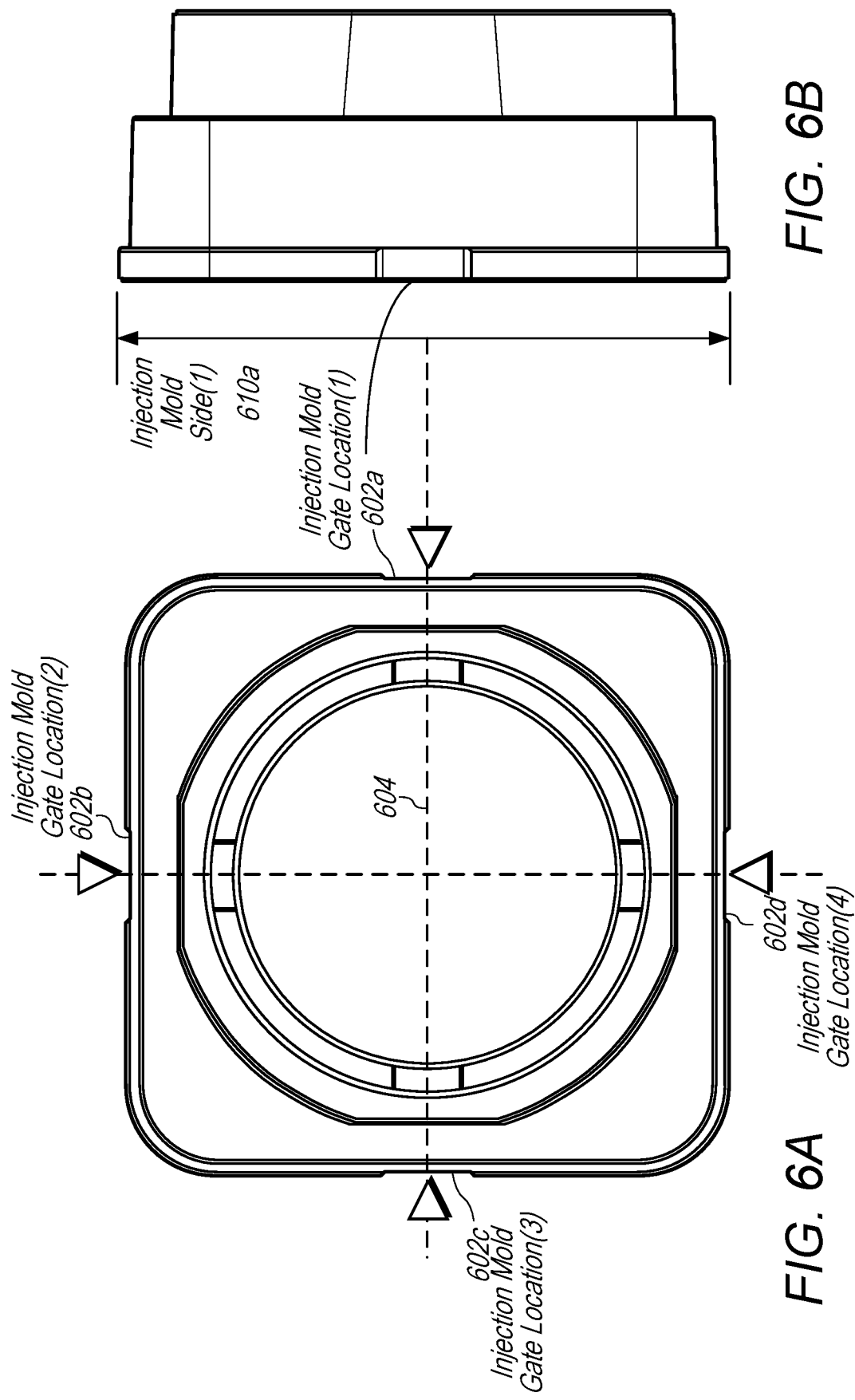

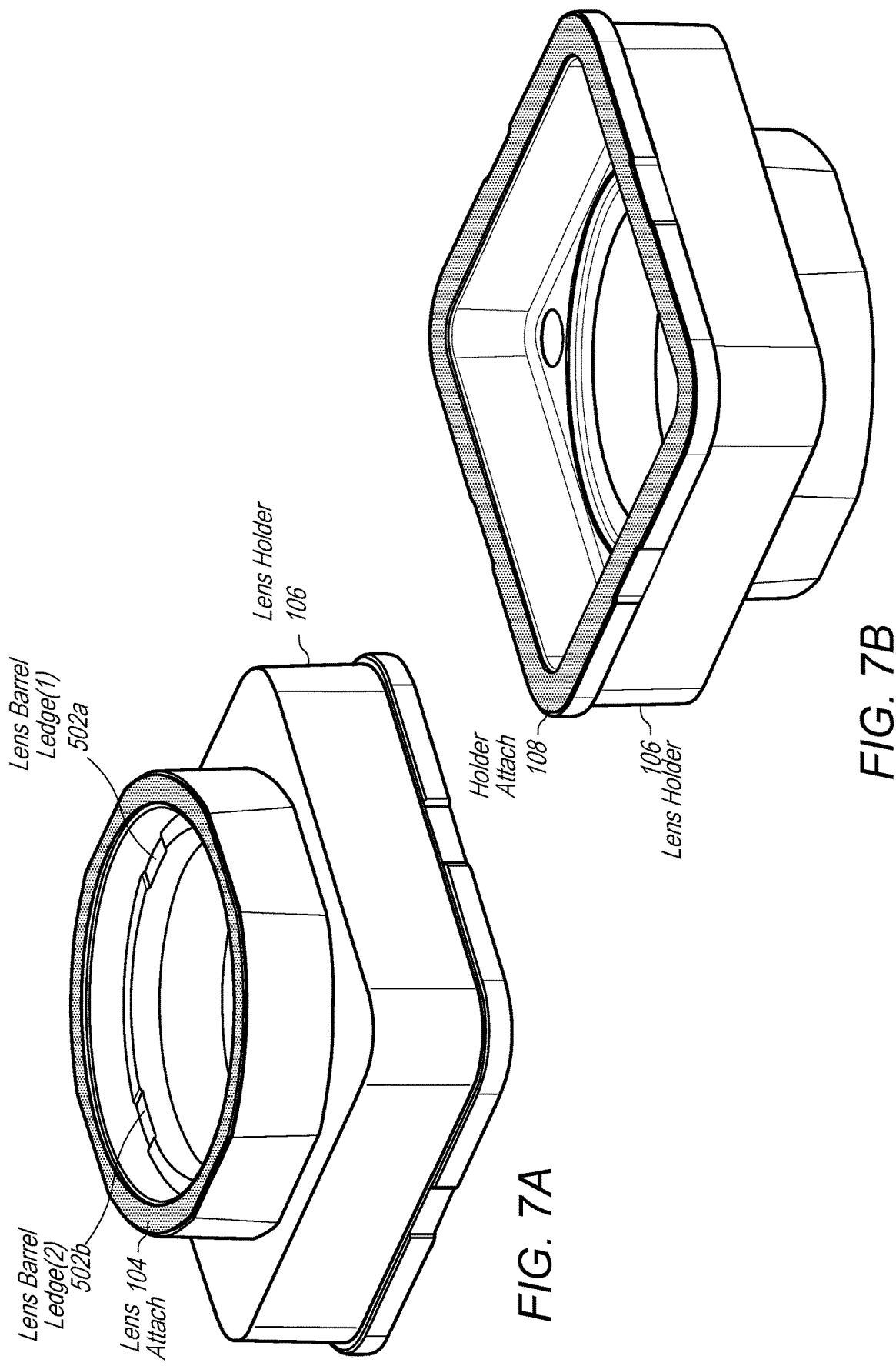

LENS HOLDER TO COMPENSATE FOR OPTICAL FOCAL SHIFT BY THERMO-MECHANICAL EXPANSION

This application claims benefit of priority to U.S. Patent Application Ser. No. 62/826,673, filed Mar. 29, 2019, which is incorporated herein by reference in its entirety.

BACKGROUND

Technical Field

This disclosure relates generally to a lens holder for a lens assembly and more particularly to a lens holder to compensate for optical focal shift by thermos-mechanical expansion.

Description of the Related Art

The advent of small, mobile multipurpose devices such as smartphones and tablet or pad devices has resulted in a need for high-resolution, small form factor cameras for integration in the devices. A temperature change may result in thermal expansion/contraction, resulting in an optics focus shift. Some small form factor cameras may incorporate optical image stabilization (OIS) mechanisms including actuators to compensate for optics focus shift over temperature. Such OIS mechanisms may increase design complexity, manufacturing difficulty, cost, and reliability risk.

SUMMARY OF EMBODIMENTS

Some embodiments provide a camera module that includes a lens assembly, a lens holder, and an image sensor assembly. The lens assembly has a particular optical design and includes at least a lens barrel and multiple lens elements embedded within the lens barrel. A change of temperature causes an optical focal shift that is determined according to a particular optical thermal shift rate associated with the particular optical design. The lens holder has a lens holder coefficient of thermal expansion (CTE) to compensate for the optical focal shift by thermo-mechanical expansion. The change of temperature causes a length expansion of the lens holder that is determined at least in part according to the lens holder CTE. The image sensor assembly includes at least an image sensor and a substrate coupled to the image sensor. The image sensor is configured to capture light passing through the multiple lens elements of the lens assembly and to convert the captured light into image signals. A first area of the lens holder is attached to the lens barrel of the lens assembly using a lens attach adhesive, and a second area of the lens holder is attached to the substrate of the image sensor assembly using a holder attach adhesive.

Some embodiments provide a mobile device that includes a camera module, a display, and one or more processors. The camera module of the mobile device includes a lens assembly, a lens holder, and an image sensor assembly. The lens assembly has a particular optical design and includes at least a lens barrel and multiple lens elements embedded within the lens barrel. A change of temperature causes an optical focal shift that is determined according to a particular optical thermal shift rate associated with the particular optical design. The lens holder has a lens holder CTE to compensate for the optical focal shift by thermo-mechanical expansion. The change of temperature causes a length expansion of the lens holder that is determined at least in part according to the lens holder CTE. The image sensor assembly of the mobile device includes at least an image sensor and a substrate coupled to the image sensor. The image sensor is configured to capture light passing through the multiple lens elements of the lens assembly of the mobile device and to convert the captured light into image signals. A first area of the lens holder is attached to the lens barrel of the lens assembly using a lens attach adhesive, and a second area of the lens holder is attached to the substrate of the image sensor assembly using a holder attach adhesive. The one or more processors of the mobile device are configured to cause the display of the mobile device to present an image based at least in part on one or more of the image signals from the image sensor of the camera module.

Some embodiments provide an article of manufacture that includes a lens assembly and a lens holder. The lens assembly has a particular optical design and includes at least a lens barrel and multiple lens elements embedded within the lens barrel. A change of temperature causes an optical focal shift that is determined according to a particular optical thermal shift rate associated with the particular optical design. The lens holder has a lens holder CTE to compensate for the optical focal shift by thermo-mechanical expansion. A first area of the lens holder is attached to the lens barrel of the lens assembly using a lens attach adhesive, and the change of temperature causes a length expansion of the lens holder that is determined at least in part according to the lens holder CTE.

BRIEF DESCRIPTION OF THE DRAWINGS

FIGS. 6A and 6B illustrate top and side views of an injection mold with a symmetrical arrangement of multiple injection molding gates for forming the lens holder, according to some embodiments.

FIGS. 7A and 7B illustrate perspective views of the lens holder including adhesives for attachment of the lens holder to the lens assembly and the image sensor assembly, according to some embodiments.

Figure 1A:
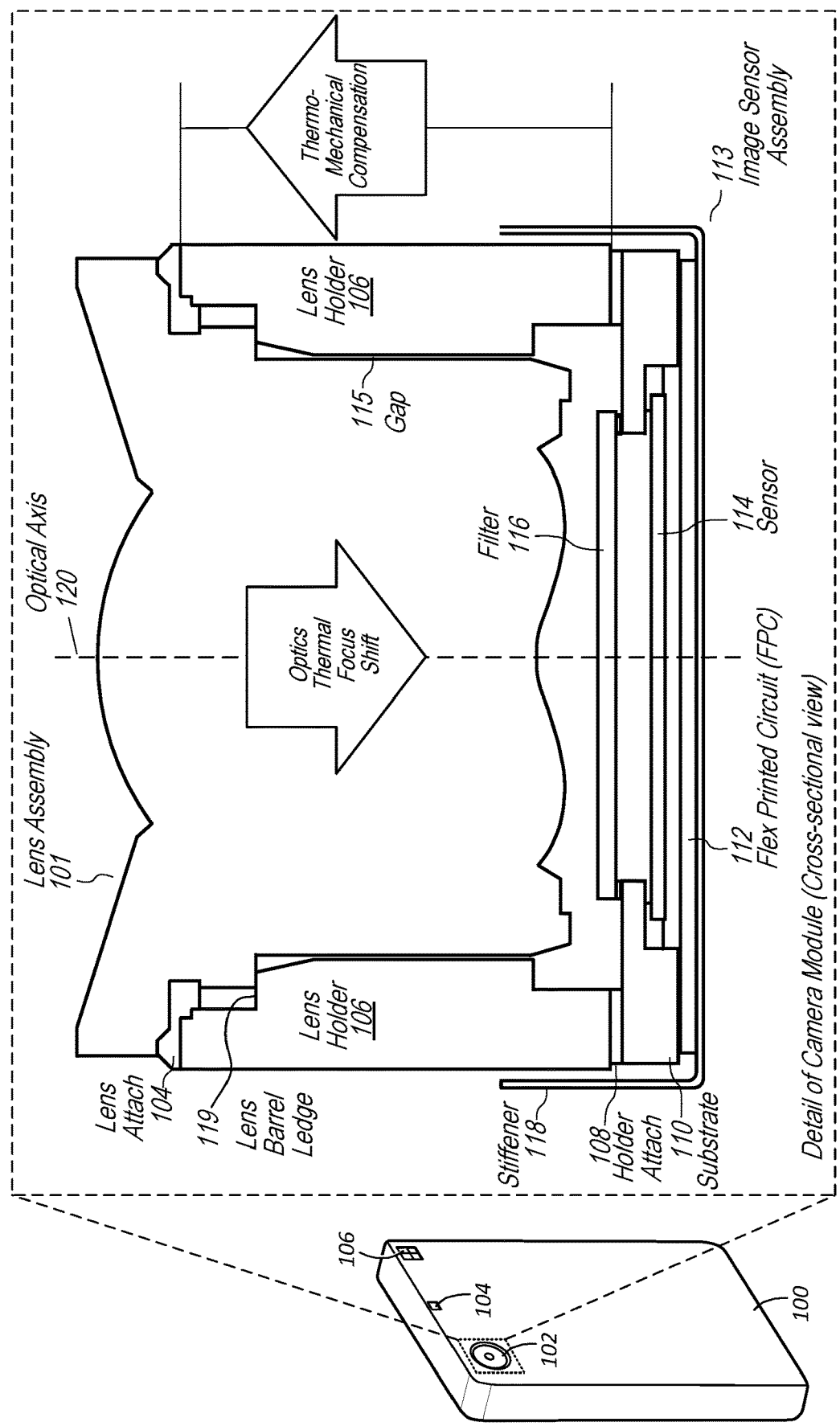
FIG. 1A illustrates a mobile device which includes a lens assembly and a lens holder to compensate for an optical focal shift by thermo-mechanical expansion, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

The present disclosure describes a design for a camera, such as a fixed focus rear camera for a mobile device, whereby the mechanical design is developed around an image sensor and optics to provide "athermalization." In other words, the function of the mechanical design of the package is to compensate for the focal shift of the optics over temperature. The mechanical design, including aspects such as architecture, geometry and material properties, are described further herein. The mechanical design corresponds to a two-body design in which a lens holder has a coefficient of thermal expansion (CTE) designed to thermo-mechanically compensate for an optics focus shift over temperature associated with a particular optical design by thermal expansion.

In contrast to other fixed focus assembly concepts such as threaded lens design or a unibody design, the two-body design of the present disclosure may provide several design advantages. To illustrate, the mechanical design of the present disclosure is a threadless design. Compared to a threaded design, the mechanical design of the present disclosure reduces the impact of torque onto optics reliability. Further, the threadless design avoids "fit" issues due to circularity of lens housing (non-symmetrical) and adds flexibility in the location of the attachment method. Compared to a unibody design, the two-body design of the present disclosure has a separate housing design from lens barrel/optics development. Further, the two-body design decouples functions, with the high CTE lens holder material not limited by lens barrel material requirements.

Figure 1B:
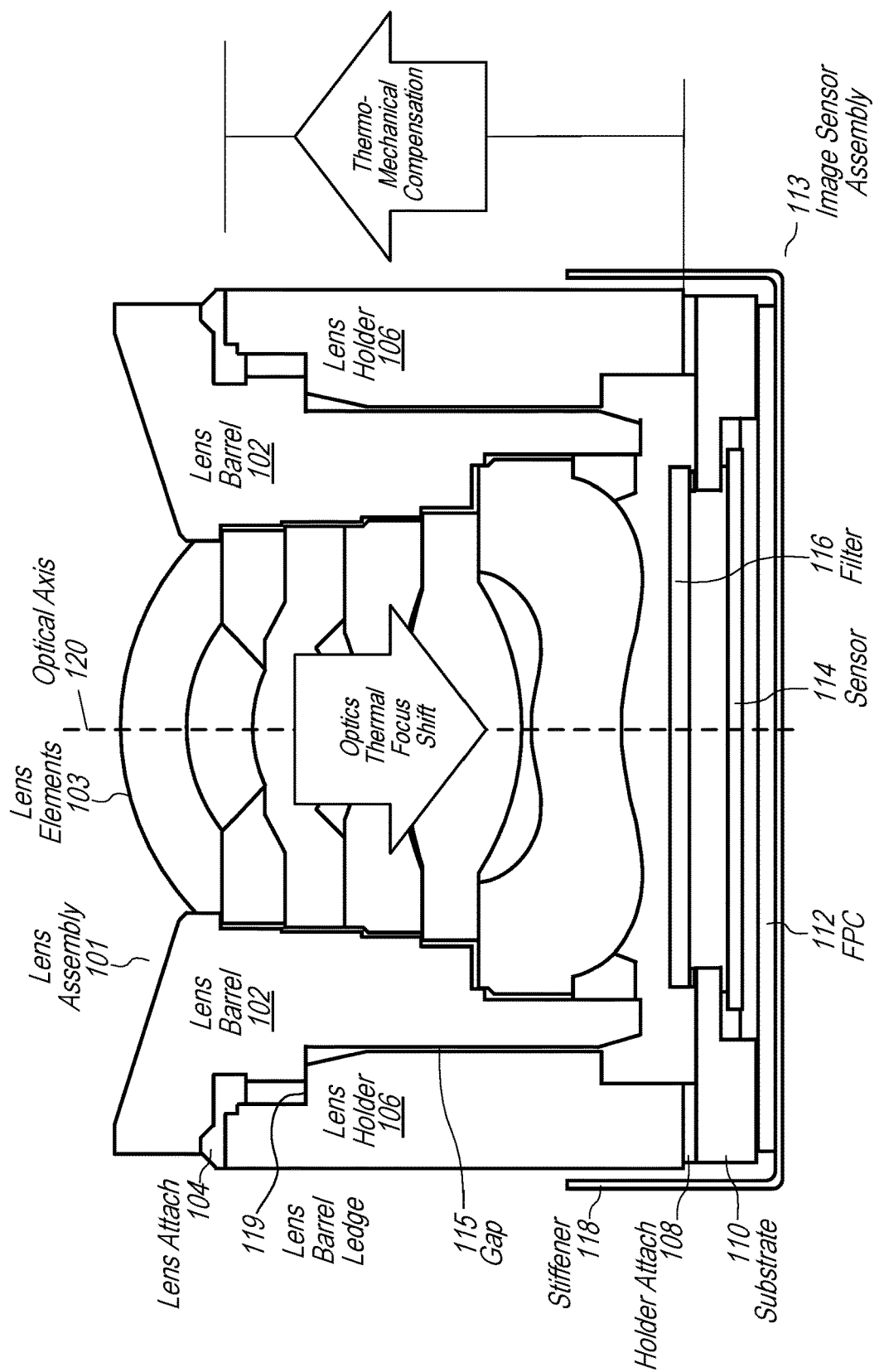
FIG. 1B is a cross-sectional detailed view of the lens assembly depicted in FIG. 1A, according to some embodiments.

FIG. 1A illustrates a mobile computing device 100 with a camera module 102, a sensor 104, and a light source module 106. FIG. 1A further illustrates a cross-sectional view of detail of the camera module 102 of the mobile computing device 100. FIG. 1A depicts a simplified view of a lens assembly 101 of the camera module 102. In some embodiments, the lens assembly 101 has a particular optical design that includes at least a lens barrel and multiple lens elements embedded within the lens barrel. FIG. 1B depicts a detailed view of a particular embodiment of such an optical design, in which the lens assembly 101 includes a lens barrel 102 and multiple lens elements 103 embedded within the lens barrel 102. As described further herein, a change in temperature causes an optical focal shift (depicted as a downward arrow labeled "Optics Thermal Focus Shift" in FIGS. 1A and 1B) that is determined according to a particular optical thermal shift rate associated with the particular optical design (see e.g. FIG. 3 for the particular optical design depicted in FIG. 1B). FIG. 1A further illustrates that the camera module 102 also includes a lens holder 106 having a lens holder CTE to compensate for the optical focal shift by thermo-mechanical expansion (depicted as an upward arrow labeled "Thermo-Mechanical Compensation" in FIGS. 1A and 1B). The change in temperature causes a length expansion of the lens holder 106 that is determined at least in part according to the lens holder CTE. As described further herein, the lens holder 106 is designed to have material properties such that the thermo-mechanical expansion of the lens holder 106 sufficiently compensates for the optical focal shift to satisfy an image quality metric. To illustrate, the thermo-mechanical expansion of the lens holder 106 may be sufficient to prevent a loss in image sharpness that may appear visible to a user (also referred to as a "just noticeable" defect).

The detailed cross-sectional view of FIG. 1A illustrates that the camera module 102 of the mobile computing device 100 also includes an image sensor assembly 113. The image sensor assembly 113 includes an image sensor 114 that is configured to capture light passing through the lens assembly 101 and to convert the captured light into image signals. The image sensor assembly 113 includes a substrate 110 that is coupled to the image sensor 114. In FIG. 1A, a "rear" side of the mobile device 100 is illustrated to show that the camera module 102 may be a fixed focus rear camera. While not shown in FIG. 1A, the mobile device 100 may include a display on a "front" side. Further, the mobile device 100 of FIG. 1A may include one or more processors configured to cause the display (on the front side) to present an image based at least in part on one or more of the image signals from the image sensor 114.

A first area of the lens holder 106 may be attached to the lens assembly 101 using a lens attach adhesive 104, and a second area of the lens holder 106 may be attached to the substrate 110 using a holder attach adhesive 108. As described further herein, both the lens attach adhesive 104 and the holder attach adhesive 108 may be selected to form bonds to the lens holder 106 that are reliable under thermal stress. To illustrate, the lens holder CTE may be relatively high compared to a lens barrel material and/or a substrate material, representing a CTE mismatch. Improper selection of adhesive may result in delamination over thermal stress (i.e. temperature cycling). Accordingly, the lens attach adhesive 104 may be selected such that the adhesive properties achieve a reliable bond between the lens holder 106 and the lens barrel 102, and the holder attach adhesive 108 may be selected such that the adhesive properties achieve a reliable bond between the lens holder 106 and the substrate 110.

In some embodiments, the lens attach adhesive 104 may correspond to an epoxy resin available from Dexerials or Namics having the following material properties: a CTE value within a range of 70 to 100 ppm/° C.; and an elastic modulus value in a range of 2500 to 3000 mPa. In some embodiments, the holder attach adhesive 104 may correspond to an epoxy resin available from Namics or Henkel having the following material properties: a CTE value within a range of 150 to 180 ppm/° C.; and an elastic modulus value in a range of 300 to 800 mPa.

The detailed cross-sectional view of FIG. 1A further illustrates that, in some embodiments, the camera module 102 may include a filter 116, such as an infrared component filter (IRCF). The filter 116 may be located below the lens assembly 101 in some embodiments. As such, in some instances, light may pass through one or more lenses of the lens assembly 101, then through the filter 116, and to the image sensor 114. According to some embodiments, there may be a gap portion between the filter 116 and the image sensor 114. In some embodiments, the gap portion may comprise air, or other gasses, such as nitrogen, helium, hydrogen, etc. In some embodiments, a gap portion may be a vacuum layer.

The detailed cross-sectional view of FIG. 1A further illustrates that a gap 115 between the lens assembly 101 and the lens holder 106. The gap 115 is sufficient to allow for thermo-mechanical expansion of the lens holder 106 without impacting the lens assembly 101 via contact during thermal cycling. The detailed cross-sectional view of FIG. 1A further illustrates that the image sensor assembly 113 may include a stiffener 118 for protection of internal components of the image sensor assembly 113, including e.g. a flexible printed circuit (FPC) 112 to receive image signals from the image sensor 114.

Figure 4:
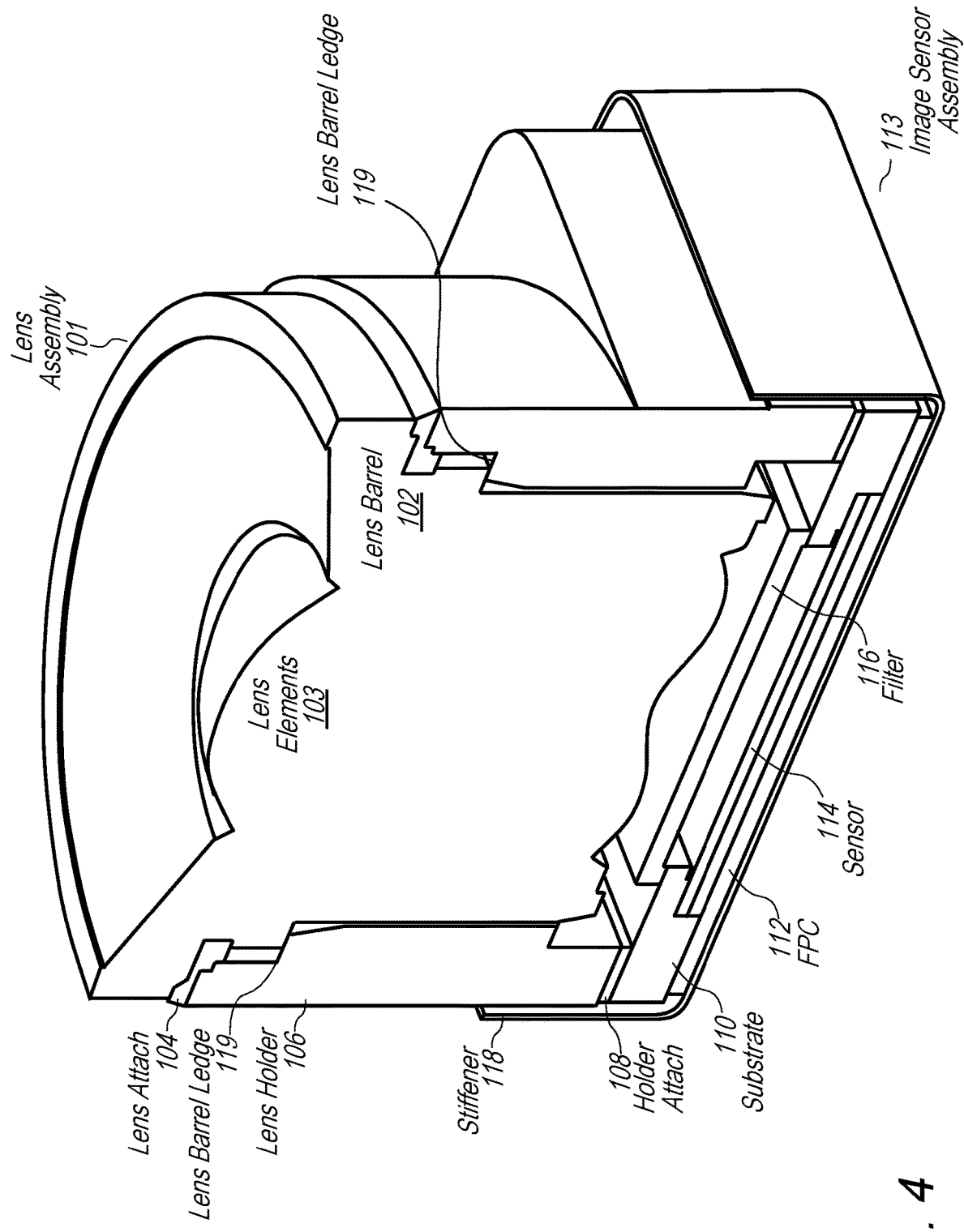
FIG. 4 is a cross-sectional perspective view of the lens assembly of FIG. 1A to illustrate positioning of the lens holder with respect to a lens barrel of the lens assembly and the image sensor assembly, according to some embodiments.
Figure 5:
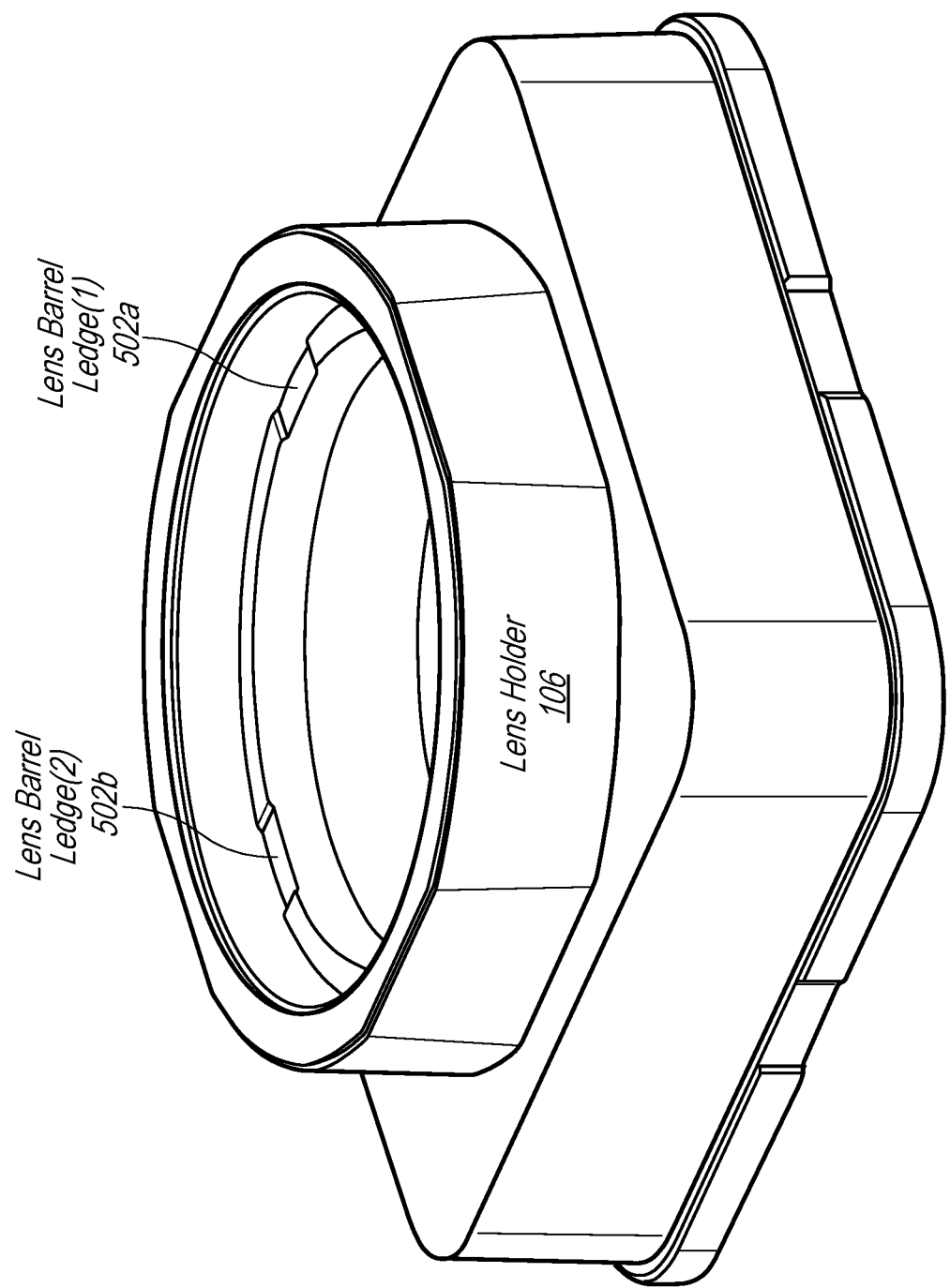
FIG. 5 illustrates a perspective view of the lens holder of FIG. 4, according to some embodiments.

FIG. 1A illustrates that, in some embodiments, the lens holder 106 may include one or more lens barrel ledges 119 for positioning of the lens assembly 101 within the lens holder 106, as illustrated and further described herein with respect to FIGS. 4, 5 and 7A. A camera active alignment process ensures that, at room temperature, the lens focus is aligned at the top of image sensor 114 for maximum image quality (illustrated by an optical axis 120 in FIG. 1A). As the temperature of the lens assembly 101 changes (with respect to room temperature), the position of optical focus shifts, either towards or away from the mean position. This results in degraded image quality. In the camera module 102 of the present disclosure, focal repositioning is achieved by "athermalization," where the lens holder 106 expands thermally to re-adjust the lens-to-sensor distance and restore image quality. In order to achieve satisfactory athermalization, a resin material utilized to form the lens holder 106 may be carefully selected for a desired thermal compensation. The resin material is selected such that a thermo-mechanical compensation rate of the lens holder 106 is similar to an optics thermal defocus rate associated with the lens assembly 101. Relatively similar rates reduce the potential over/under compensation associated with rate differences.

Referring to FIG. 1B, a detailed cross-sectional view illustrates a particular embodiment of an optical design, in which the lens assembly 101 includes a lens barrel 102 and multiple lens elements 103 embedded within the lens barrel 102. For a particular optical design for the lens assembly 101, the present disclosure may include simulating a defocus rate based on thermal characteristics and using this defocus rate as a target thermal expansion rate for the lens holder 106 to compensate for this defocus rate.

In some embodiments, the optical thermal shift rate for the lens assembly 101 may be within a range of 0.5 µm/° C. to 1.0 µm/° C. In this case, the compensation rate is targeted to cancel the optical focus shift. To illustrate, an increase in temperature causes thermal expansion of the lens holder 106 along a characteristic dimension of the lens holder 106 defined with respect to the optical axis 120 (also referred to herein as a "length" of the lens holder 106). The increase in temperature also causes thermal expansion of the lens attach adhesive 104 as well as the holder attach adhesive 108. As such, a "total" thermal expansion rate may vary based on a particular combination of CTE of the lens holder 106 (the "lens holder CTE"), CTE of the lens attach adhesive 104, and CTE of the holder attach adhesive 108.

In some embodiments, the lens holder CTE may be within a range of 100 parts-per-million (ppm)/° C. to 140 ppm/° C., and the lens holder 106 may have a water absorption property of less than 0.2 percent to provide satisfactory dimensional stability of the lens holder 106 over moisture. In some cases, the lens holder 106 may be a polybutylene terephthalate (PBT) material. Alternatively, the lens holder 106 may be an alloy of a polycarbonate (PC) material and a PBT material. It will be appreciated that alternative plastic materials satisfying particular performance criteria may also be utilized for the lens holder 106.

In some embodiments (e.g., when the lens holder 106 is a PBT material), the lens holder CTE may be within a range of 100 parts-per-million (ppm)/° C. to 140 ppm/° C., and the lens barrel 102 may be a PC material having a lens barrel CTE of about 70 ppm/° C. In this example, the lens attach adhesive 104 may correspond to an epoxy resin available from Dexerials or Namics having the following material properties: a CTE value within a range of 70 to 100 ppm/° C.; and an elastic modulus value in a range of 2500 to 3000 mPa.

In some embodiments (e.g., when the lens holder 106 is a PBT material), the lens holder CTE may be within a range of 100 parts-per-million (ppm)/° C. to 140 ppm/° C., and the substrate 110 may be an alumina ceramic material having a substrate CTE of about 7 ppm/° C. In this example, the holder attach adhesive 104 may correspond to an epoxy resin available from Namics or Henkel having the following material properties: a CTE value within a range of 150 to 180 ppm/° C.; and an elastic modulus value in a range of 300 to 800 mPa.

Thus, FIGS. 1A and 1B illustrate an example of a lens holder to compensate for an optical focal shift by thermo-mechanical expansion. As described further herein with respect to FIGS. 6A-6B, the lens holder depicted in FIGS. 1A-1B may be manufactured using an injection molding process that utilizes an injection mold with a symmetrical arrangement of multiple injection molding gates (e.g., four gates, with one gate for each side). The symmetrical arrangement is designed to provide substantially similar resin flow through each of the gates for substantially isotropic material properties throughout the lens holder.

Figure 2:
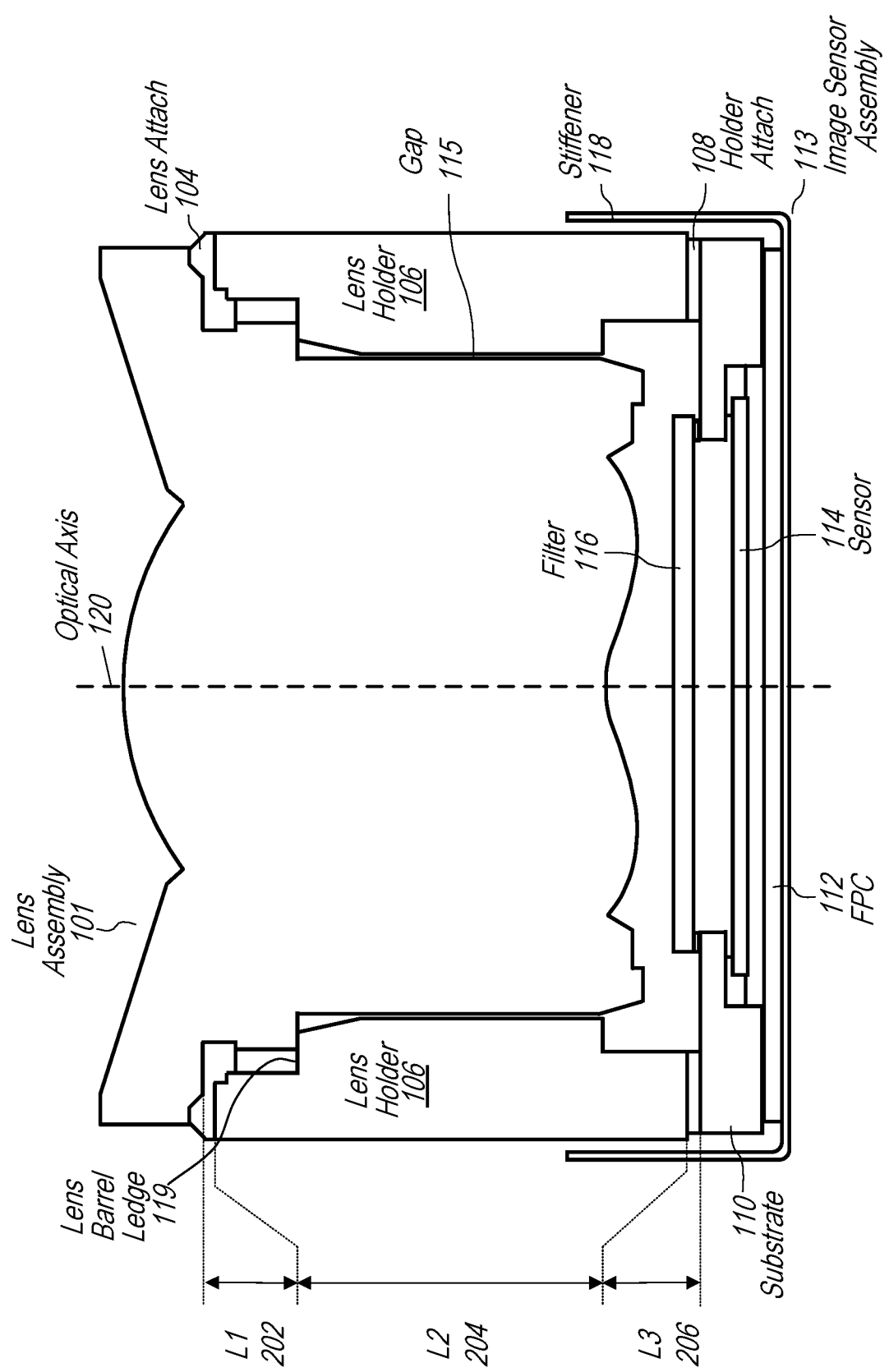
FIG. 2 is a cross-sectional detailed view of the lens assembly depicted in FIG. 1A to illustrate thermal expansion along a length of the lens holder, according to some embodiments.

FIG. 2 illustrates a cross-sectional view of the lens assembly 101, illustrating various changes of length resulting from thermal expansion/contraction due to temperature change.

Thermal expansion may be described by the thermal expansion equation below:

$$\frac{\Delta L}{L_0} = \alpha \times \Delta T$$

In the thermal expansion equation above, $L_0$ is an initial length (e.g., a length at room temperature, such as during the component active assembly process); $\Delta L$ is the length change; $\alpha$ is the coefficient of thermal expansion (CTE) for the particular material; and $\Delta T$ is the temperature range.

In FIG. 2, multiple length values are illustrated to show different components of a total length change for thermo-mechanical compensation of the optics thermal focal shift depicted in FIGS. 1A and 1B. In FIG. 2, a first length value (identified as "L1") 202 is designed to illustrate a length component associated with the lens attach adhesive 104; a second length value (identified as "L2") is designed to illustrate a length component associated with the lens holder 106; and a third length value (identified as "L3") is designed to illustrate a length component associated with the holder attach adhesive 108. As described further herein, a thermo-mechanical compensation rate resulting from the total length of expansion (including each of the length components 202, 204, and 206) is targeted to cancel an optical focus shift for a particular sensor/optics configuration. It will be appreciated that the second length component 204 may represent the most substantial component, thereby providing the largest contribution to the thermo-mechanical expansion.

With respect to image quality for user impact, studies around "just noticeable" defect (JND) metrics suggest that a defocus rate of about 0.1-0.2 µm/° C. may appear visible to a user. In other words, defocus of about 3-6 µm over a 30° C. temperature range causes sufficient loss in image sharpness to be noticeable by the user. In some embodiments, an optical shift rate associated with a particular sensor/optics configuration (e.g., the design depicted in FIGS. 1A and 1B) may be within a range between 0.5 µm/° C. and 1.0 µm/° C. A determination of the optical shift rate is described further herein with respect to the example depicted in FIG. 3. An illustrative, non-limiting example of an optical shift rate within this range is 0.63 µm/° C. for a temperature range of 10° C. to 70° C. In this case, the lens holder 106 may have a CTE value within a range between 100 ppm/° C. and 140 ppm/° C. to satisfy an image quality performance metric, such as a JND metric of about 0.1-0.2 µm/° C.

As a first example, the lens holder 106 may be formed from a first polybutylene terephthalate (PBT) material, and the lens holder 106 has a first CTE value of 110 ppm/° C. An example of such a PBT material may be Crastin™ from Dupont. In this case, the expansion rate of the lens holder 106 may be 0.610 µm/° C., representing a total defocus rate of 0.020 µm/° C. when compared to an optical shift rate of 0.63 µm/° C. This total defocus rate would satisfy the JND metric of about 0.1-0.2 µm/° C. for image quality.

As a second example, the lens holder 106 may be formed from a second PBT material, and the lens holder 106 has a second CTE value of 120 ppm/° C. An example of such a PBT material may be Novoduran™ from Mitsubishi. In this case, the expansion rate of the lens holder 106 may be 0.698 µm/° C., representing a total defocus rate of –0.068 µm/° C. when compared to an optical shift rate of 0.63 µm/° C. This total defocus rate would also satisfy the JND metric of about 0.1-0.2 µm/° C. for image quality.

As a third example, the lens holder 106 may be formed from a mixture of a polycarbonate (PC) material and a PBT material (also referred to herein as a "PC/PBT" material or a PC/PBT alloy), and the lens holder 106 has a third CTE value of 100 ppm/° C. An example of such a PC/PBT material may be Duranex™ from Polyplastics. In this case, the expansion rate of the lens holder 106 may be 0.550 µm/° C., representing a total defocus rate of 0.080 µm/° C. when compared to an optical shift rate of 0.63 µm/° C. This total defocus rate would also satisfy the JND metric of about 0.1-0.2 µm/° C. for image quality.

It will be appreciated that the above examples are for illustrative purposes only and are not intended to limit the scope of the claimed invention. Rather, the examples serve to illustrate that selecting a lens holder material with a particular CTE value may result in the thermo-mechanical expansion rate substantially offsetting the optical focus shift, such that a total defocus rate may satisfy an image quality performance metric such as the JND metric described herein.

Figure 3:
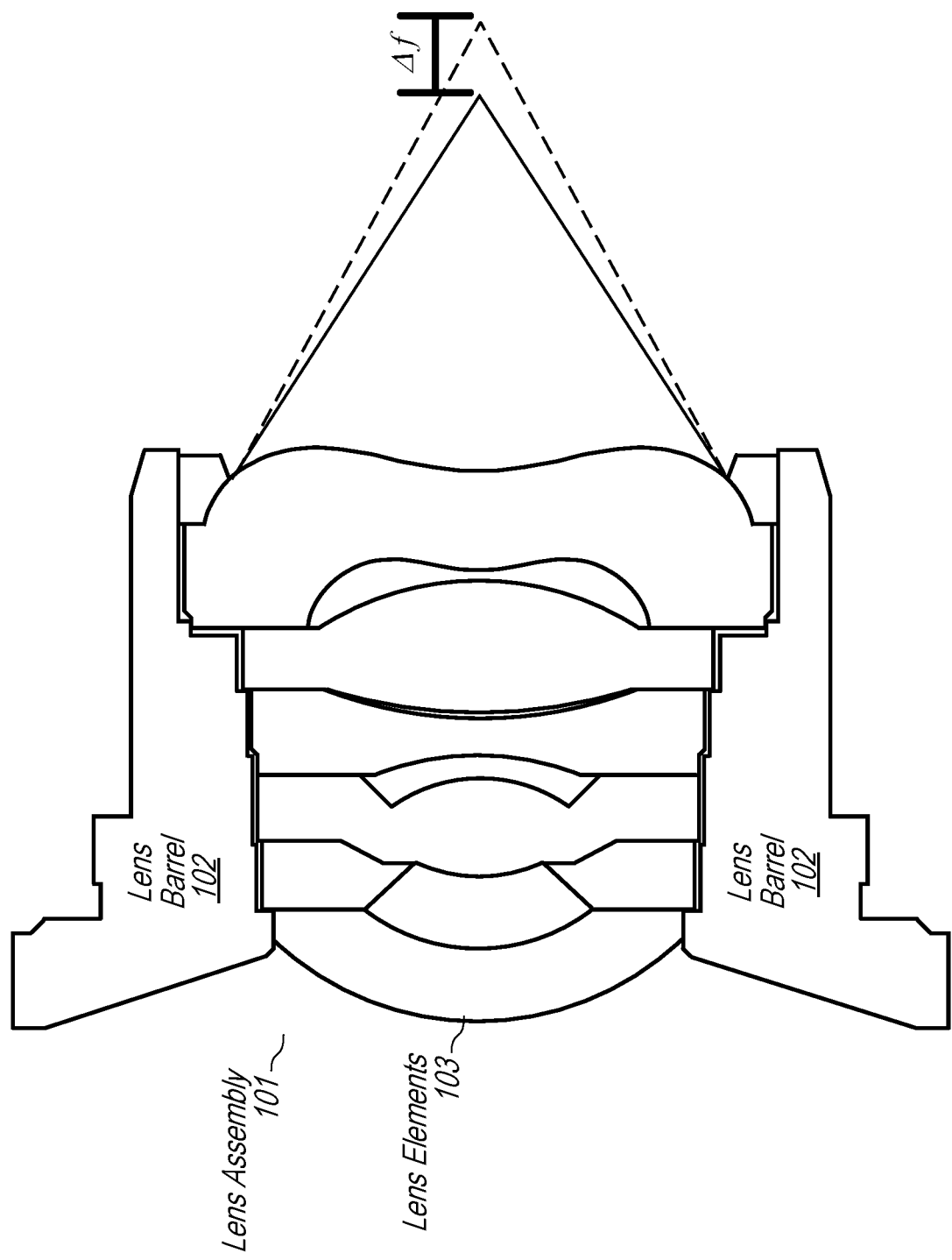
FIG. 3 is a side view of the lens assembly depicted in FIG. 1B to illustrate that a change of temperature causes an optical focal shift, according to some embodiments.

FIG. 3 illustrates a side view of the particular optical design for the lens assembly 101 depicted in FIG. 1B (including the multiple lens elements 103 within the lens barrel 102) to show an example of such an optical focus shift.

Optical shift over temperature is caused by three factors. The first factor is the change in the index of refraction over temperature. As the index of refraction changes, so too does the power of the lens which causes a change in focal length regardless of any mechanical changes. This is the dominant reason that the optical focus shifts. The second factor is the change in the surface figure (the physical shape of the lens) which also changes the focal length of the lens. The third factor is that any change in the mechanical length of the component that will shift the focus position.

A change in focal length ($\Delta f$), as depicted in FIG. 3, may be described by Equation (I) below:

$$\Delta f = \beta f \Delta T \tag{I}$$

In Equation(I), f is the focal length, and $\Delta T$ is the change in temperature from nominal. In Equation(I), $\beta$ may be described by Equation (II) below:

$$\beta = \alpha - \frac{1}{n(\lambda) - 1} \frac{dn_{rel}}{dT} \tag{II}$$

In Equation(II), $\alpha$ is the material CTE; $n(\lambda)$ is the index of refraction at the design wavelength; and $$\frac{dn_{rel}}{dT}$$

is the change in the relative index of refraction over temperature.

As the focus changes with respect to temperature, it can be described as a rate of change by examining the change in focus over the change in temperature. This change can be approximated by the first order equation corresponding to Equation(III) below:

$$R_{change} = \frac{\Delta f}{\Delta T} \quad \text{(III)}$$

This rate of change is referred to herein as "an optical shift rate over temperature" or simply "an optical shift rate."

FIG. 4 is a cross-sectional perspective view of the camera module 102 of FIG. 1A, illustrating the lens holder 106 bonded to the image sensor assembly 113 and the lens barrel 102. FIG. 5 is a perspective view of the lens holder 106 prior to the lens holder 106 being bonded to the image sensor assembly 113 and the lens barrel 102, as shown in FIG. 4. The perspective view depicted in FIG. 5 shows that the lens holder 106 may have multiple lens barrel ledges 502a-n to receive corresponding portions of the lens barrel 102. In the perspective view of FIG. 5, a first lens barrel ledge 502a and a second lens barrel ledge 502b are visible, with two other lens barrel ledges obscured from view. As illustrated and further described herein with respect to FIGS. 6A and 6B, the first lens barrel ledge 502a may align with a first injection mold gate location of an injection mold used to form the lens holder 106, and the second lens barrel ledge 502b may align with a second injection mold gate location of the injection mold.

FIGS. 6A and 6B illustrate a four gate design for injection molding to form the lens holder 106 depicted in FIG. 5. FIG. 6A is a top view of the injection mold, illustrating four injection mold gate locations 602a-d arranged symmetrically with respect to a symmetry axis 604. FIG. 6B is a side view of the injection mold, illustrating a side dimension of a first side 610a of the inject mold corresponding to a first injection mold gate location 602a of the four injection mold gate locations 602a-d depicted in the top view of FIG. 6A. In an illustrative, non-limiting example of a lens holder designed to accommodate a particular optical design (such as the lens assembly 101 depicted in FIGS. 1A and 1B), the side dimension of the first side 610a may be 9.4 mm, and each side of the injection mold may have a substantially similar side dimension of 9.4 mm. In this example, each of the injection mold gate locations 602a-d may be centered on an axis located at the midpoint of the side dimension (i.e., at 4.7 mm along a 9.4 mm side dimension).

The symmetrical arrangement of the injection mold gate locations 602a-d is designed to provide substantially equal flow of resin into the injection mold to provide symmetrical material properties for the lens holder 106. Such symmetrical material properties are designed to provide stable/symmetric thermal expansion of the lens holder 106 to ensure substantially equal Z offset of the optics (to be housed within the lens holder 106, such as the lens assembly 101 depicted in FIGS. 1A and 1B) to prevent a tilt that would cause loss of sharpness towards the edge of the field (blurry corners).

Thus, the four gate design depicted in FIGS. 6A and 6B represents an example of a process of forming a substantially isotropic plastic lens holder via injection molding. It will be appreciated that alternative injection mold designs may also provide substantially symmetrical material properties for the lens holder, thereby preventing tilt of the optics during temperature cycling.

FIG. 7A is a perspective view of the lens holder 106 of FIG. 5, which may be formed according to the injection molding process described with respect to FIGS. 6A and 6B. FIG. 7A illustrates the addition of the lens attach adhesive 104 to a first area of the lens holder 106. In some embodiments, the lens attach adhesive 104 may be used to bond the lens barrel 102 of the lens assembly 101 to the lens holder 106 during a camera active alignment assembly process. In some embodiments, during the camera active alignment assembly process, corresponding features of the lens barrel 102 may be aligned with the lens barrel ledges (with two of the ledges 502a and 502b shown in FIG. 7A) for proper positioning of the lens barrel 102 within the lens holder 106, as shown in the cross-sectional perspective view depicted in FIG. 4.

FIG. 7B is an inverted perspective view of the lens holder 106 of FIG. 5, illustrating the addition of the holder attach adhesive 108 to a second area of the lens holder 106. In some embodiments, the holder attach adhesive 104 may be used to bond the substrate 110 of the image sensor assembly 113 to the lens holder 106 during a camera active alignment assembly process.

Multifunction Device Examples

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 8A:
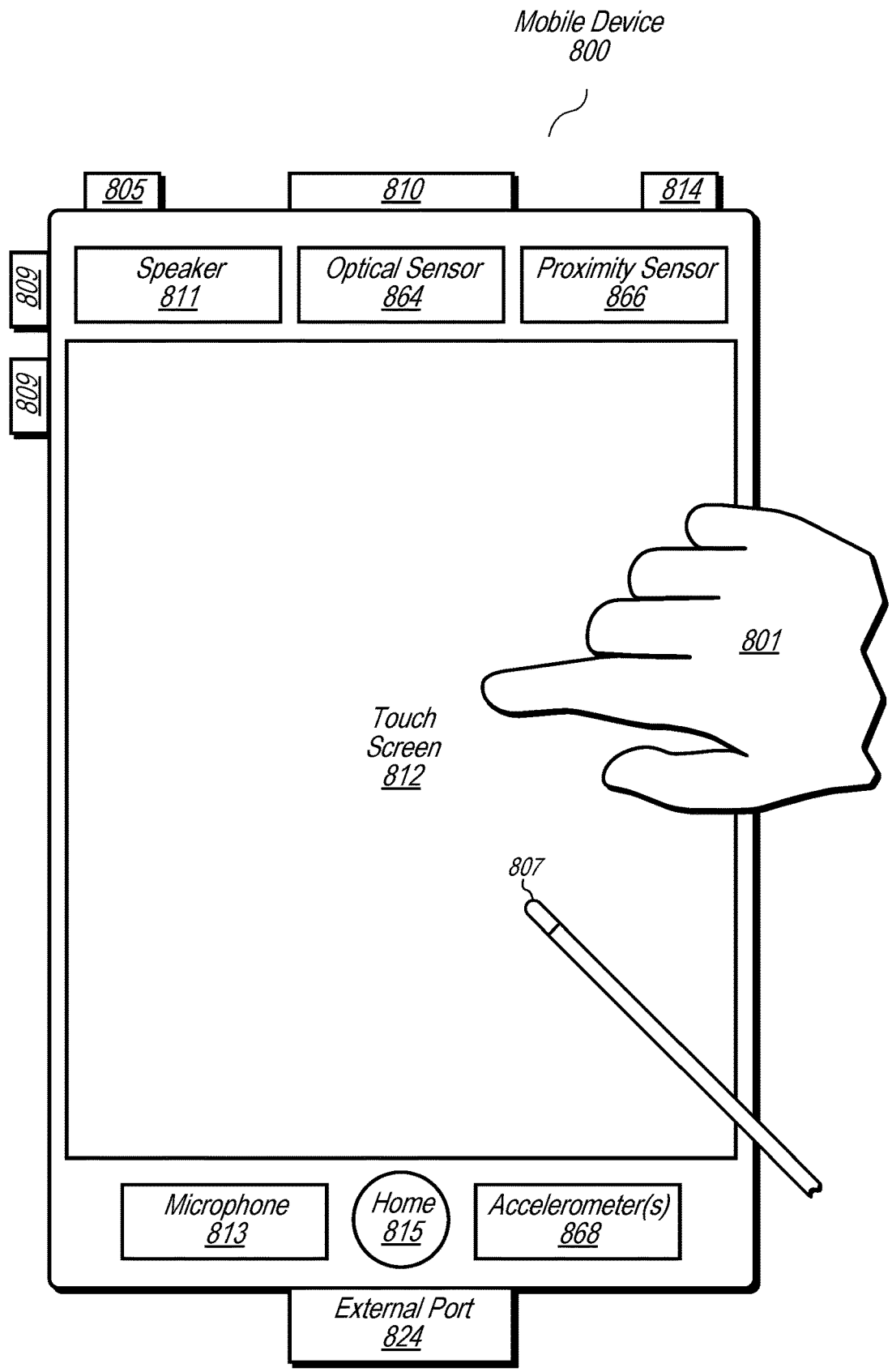
FIGS. 8A-8C illustrate a mobile device with a camera module which includes a lens assembly and a lens holder to compensate for an optical focal shift by thermo-mechanical expansion, according to some embodiments.
Figure 8B:
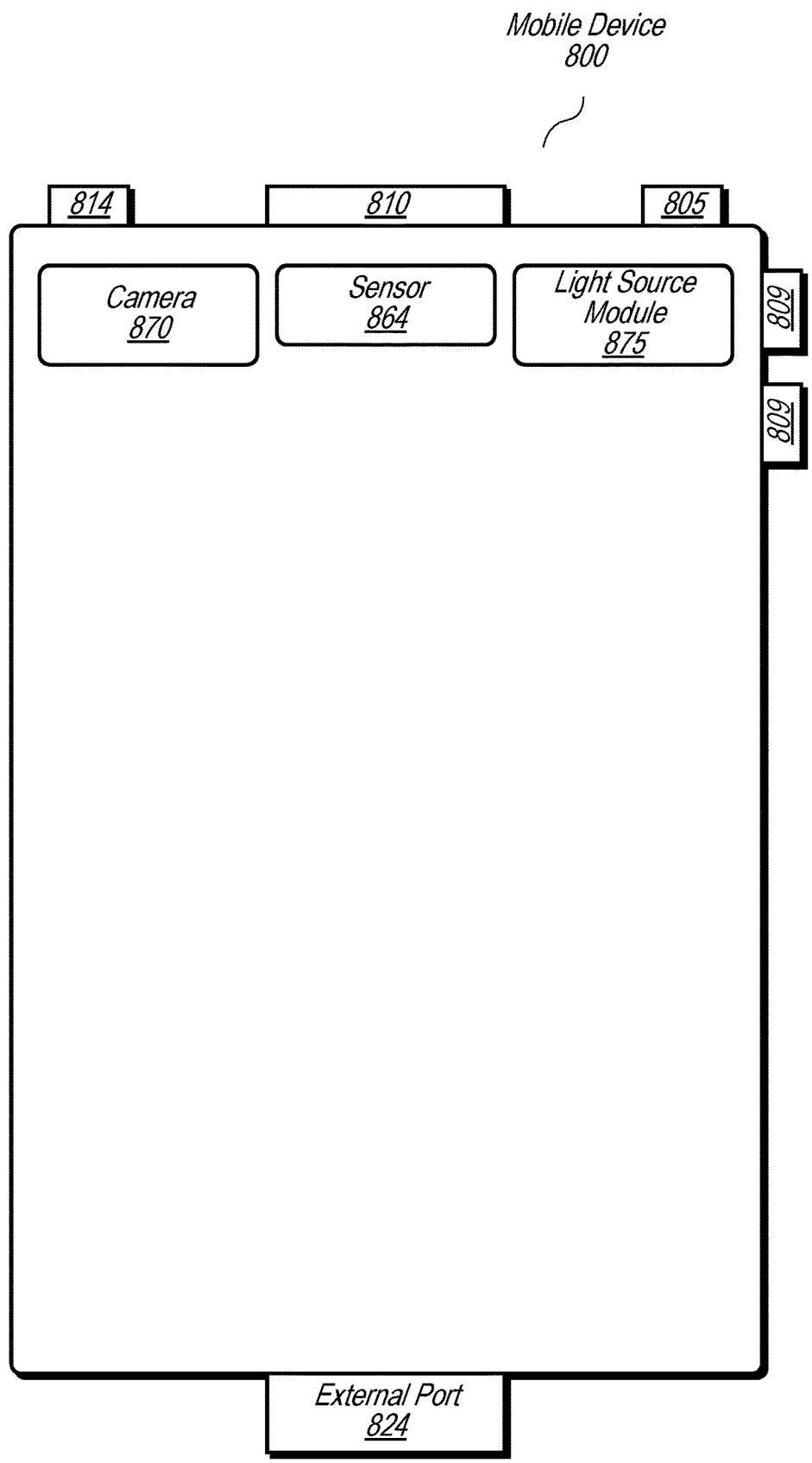
Figure 8C:
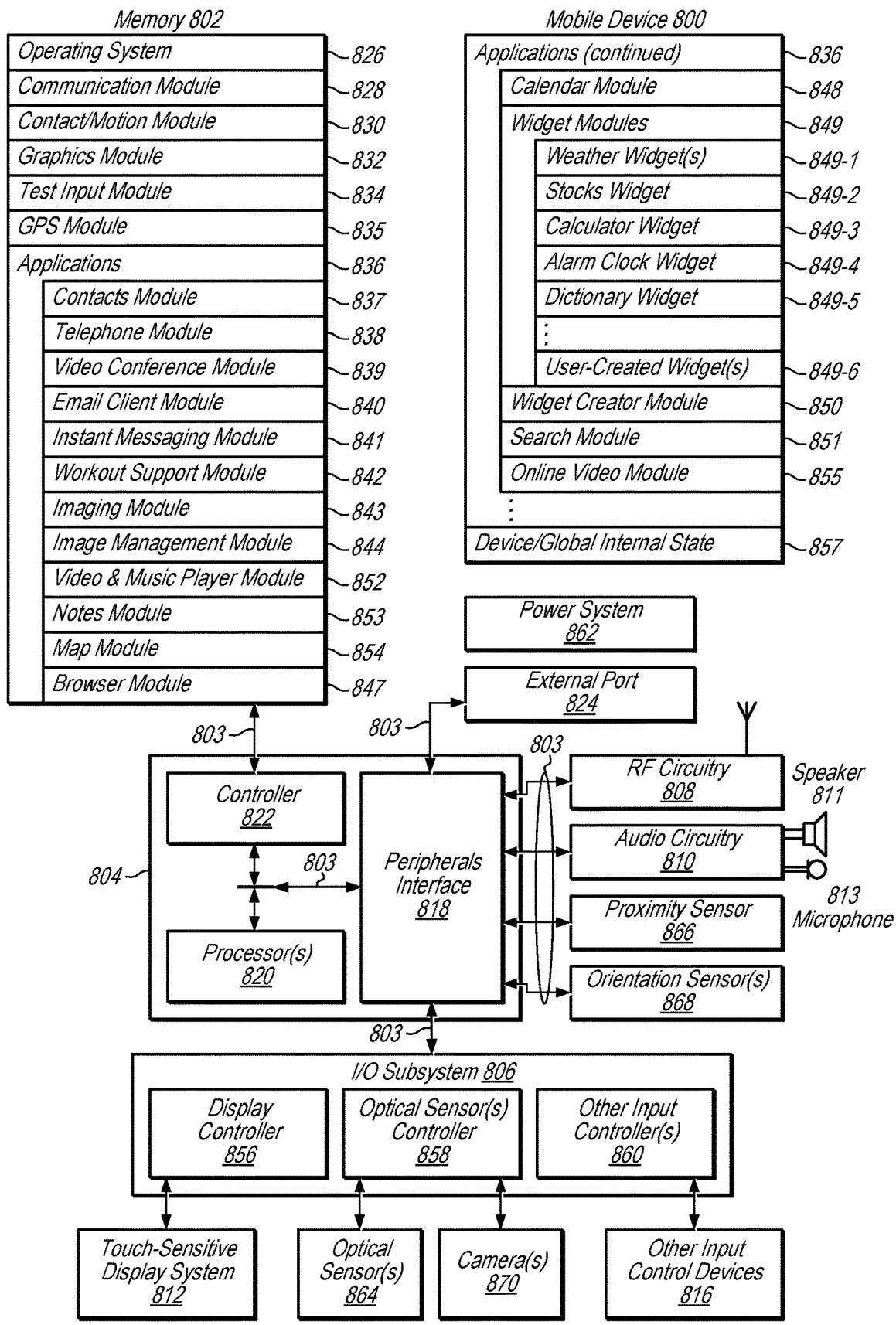

FIG. 8A-8C illustrate a mobile device 800 that may include one or more camera modules, in accordance with some embodiments. In some embodiments, the device 800 may include one or multiple features, components, and/or functionality of embodiments described herein with respect to FIGS. 1A-1B and 9.

In some embodiments of the present disclosure, the device 800 of FIGS. 8A-8C may correspond to a mobile device that may be utilized to perform various methods described further herein, such as the mobile device 100 depicted in FIG. 1A. For example, the camera module 870 of the device 800 depicted in FIG. 8B may correspond to the camera module 102 of the mobile device 100 depicted in FIG. 1A. As another example, the sensor 864 of the device 800 depicted in FIG. 8B may correspond to the sensor 104 of the mobile device 100 depicted in FIG. 1A. As yet another example, the light source module 875 of the device 800 depicted in FIG. 8B may correspond to the light source module 106 depicted in FIG. 1A.

FIG. 8A illustrates that a "front" side of the device 800 may have a touch screen 812. The touch screen 812 may display one or more graphics within user interface (UI) 800. In this embodiment, as well as others described below, a user may select one or more of the graphics by making a gesture on the graphics, for example, with one or more fingers 801 (not drawn to scale in the figure) or one or more styluses 807 (not drawn to scale in the figure).

Device 800 may also include one or more physical buttons, such as "home" or menu button 815, which may be used to navigate to any application 836 (see FIG. 8C) in a set of applications that may be executed on device 800. Alternatively, in some embodiments, the menu button is implemented as a soft key in a graphics user interface (GUI) displayed on touch screen 812.

In one embodiment, device 800 includes touch screen 812, menu button 815, push button 805 for powering the device on/off and locking the device, volume adjustment button(s) 809, Subscriber Identity Module (SIM) card slot 810, head set jack 814, and docking/charging external port 824. Push button 805 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

FIG. 8B illustrates that a "rear" side of the device 800 may include a camera 870, in accordance with some embodiments. The camera 870, which is sometimes called an "optical sensor" for convenience, may also be known as or called an optical sensor system. The camera 870 includes one or more camera modules, including at least one of the camera modules described herein. FIG. 8B further illustrates sensor 864 and light source module 875. In some embodiments of the present disclosure, the camera 870 of the device 800 depicted in FIG. 8B includes a fixed focus rear camera that may include the camera module 102 of the mobile device 100 depicted in FIG. 1A. In some embodiments, the sensor 864 of device 800 may correspond to the sensor 104 depicted in FIG. 1A, and the light source module 875 of device 800 may correspond to the light source module 106 depicted in FIG. 1A.

According to some embodiments of the present disclosure, a camera module of the camera 870 may include a lens assembly, a lens holder, and an image sensor assembly. The lens assembly has a particular optical design and includes at least a lens barrel and multiple lens elements embedded within the lens barrel. A change of temperature causes an optical focal shift that is determined according to a particular optical thermal shift rate associated with the particular optical design. The lens holder has a lens holder CTE to compensate for the optical focal shift by thermo-mechanical expansion. The change of temperature causes a length expansion of the lens holder that is determined at least in part according to the lens holder CTE. The image sensor assembly includes at least an image sensor and a substrate coupled to the image sensor. The image sensor is configured to capture light passing through the multiple lens elements of the lens assembly and to convert the captured light into image signals. A first area of the lens holder is attached to the lens barrel of the lens assembly using a lens attach adhesive, and a second area of the lens holder is attached to the substrate of the image sensor assembly using a holder attach adhesive.

Referring to FIG. 8C, a block diagram illustrates that device 800 may include memory 802 (which may include one or more computer readable storage mediums), memory controller 822, one or more processing units (CPU's) 820, peripherals interface 818, RF circuitry 808, audio circuitry 810, speaker 811, touch-sensitive display system 812, microphone 813, input/output (I/O) subsystem 806, other input control devices 816, and external port 824. Device 800 may include one or more optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8C may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 102 and/or RF circuitry 808 by peripherals interface 818. In some embodiments, audio circuitry 810 also includes a headset jack (e.g., 814, FIGS. 8A-B). The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 816 receive/send electrical signals from/to other input or control devices 816. The other input control devices 816 may include physical buttons (e.g., push buttons, rocker buttons, etc.), dials, slider switches, joysticks, click wheels, and so forth. In some alternative embodiments, input controller(s) 860 may be coupled to any (or none) of the following: a keyboard, infrared port, USB port, and a pointer device such as a mouse. The one or more buttons (e.g., 809, FIGS. 8A-8B) may include an up/down button for volume control of speaker 811 and/or microphone 813. The one or more buttons may include a push button (e.g., 806, FIGS. 8A-B).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology may be used.

Touch screen 812 may have a video resolution in excess of 100 dots per inch (dpi). In some embodiments, the touch screen has a video resolution of approximately 160 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors 864 and one or more cameras 870. FIG. 8C shows an optical sensor coupled to optical sensor controller 858 in I/O subsystem 806. Optical sensor 864 may include charge-coupled device (CCD) or complementary metal-oxide semiconductor (CMOS) phototransistors. Optical sensor 864 receives light from the environment, projected through one or more lens, and converts the light to data representing an image. In conjunction with camera(s) 870, optical sensor 864 may capture still images or video. In some embodiments, an optical sensor is located on the back of device 800, opposite touch screen display 812 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 800 may also include one or more proximity sensors 866. FIG. 8C shows proximity sensor 866 coupled to peripherals interface 818. Alternatively, proximity sensor 866 may be coupled to input controller 860 in I/O subsystem 806. In some embodiments, the proximity sensor turns off and disables touch screen 812 when the multifunction device is placed near the user's ear (e.g., when the user is making a phone call).

Device 800 includes one or more orientation sensors 868. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors include any combination of orientation/rotation sensors. FIG. 8C shows the one or more orientation sensors 868 coupled to peripherals interface 818. Alternatively, the one or more orientation sensors 868 may be coupled to an input controller 860 in I/O subsystem 806. In some embodiments, information is displayed on the touch screen display in a portrait view or a landscape view based on an analysis of data received from the one or more orientation sensors.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, and applications (or sets of instructions) 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.).

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications (e.g., contacts 837, e-mail 840, IM 841, browser 847, and any other application that needs text input).

GPS module 835 determines the location of the device and provides this information for use in various applications (e.g., to telephone 838 for use in location-based dialing, to imaging module 843 as picture/video metadata, and to applications that provide location-based services such as weather widgets, local yellow page widgets, and map/navigation widgets).

Applications 836 may include the following modules (or sets of instructions), or a subset or superset thereof:
  contacts module 837 (sometimes called an address book or contact list);
  telephone module 838;
  video conferencing module 839;
  e-mail client module 840;
  instant messaging (IM) module 841;

workout support module 842;
camera module 843 for still and/or video images;
image management module 844;
browser module 847;
calendar module 848;
widget modules 849, which may include one or more of: weather widget 849-1, stocks widget 849-2, calculator widget 849-3, alarm clock widget 849-4, dictionary widget 849-5, and other widgets obtained by the user, as well as user-created widgets 849-6;
widget creator module 850 for making user-created widgets 849-6;
search module 851;
video and music player module 852, which may be made up of a video player module and a music player module;
notes module 853;
map module 854; and/or
online video module 855.

Examples of other applications 836 that may be stored in memory 802 include other word processing applications, other image editing applications, drawing applications, presentation applications, JAVA-enabled applications, encryption, digital rights management, voice recognition, and voice replication.

In conjunction with touch screen 812, display controller 856, contact module 830, graphics module 832, and text input module 834, contacts module 837 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 838, video conference 839, e-mail 840, or IM 841; and so forth.

In conjunction with RF circuitry 808, audio circuitry 810, speaker 811, microphone 813, touch screen 812, display controller 856, contact module 830, graphics module 832, and text input module 834, telephone module 838 may be used to enter a sequence of characters corresponding to a telephone number, access one or more telephone numbers in address book 837, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 811, microphone 813, touch screen 812, display controller 856, optical sensor 864, optical sensor controller 858, contact module 830, graphics module 832, text input module 834, contact list 837, and telephone module 838, videoconferencing module 839 includes executable instructions to initiate, conduct, and terminate a video conference between a user and one or more other participants in accordance with user instructions.

In conjunction with RF circuitry 808, touch screen 812, display controller 856, contact module 830, graphics module 832, and text input module 834, e-mail client module 840 includes executable instructions to create, send, receive, and manage e-mail in response to user instructions. In conjunction with image management module 844, e-mail client module 840 makes it very easy to create and send e-mails with still or video images taken by imaging module 843.

In conjunction with RF circuitry 808, touch screen 812, display controller 856, contact module 830, graphics module 832, and text input module 834, the instant messaging module 841 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 808, touch screen 812, display controller 856, contact module 830, graphics module 832, text input module 834, GPS module 835, map module 854, and music player module 846, workout support module 842 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 812, display controller 856, optical sensor(s) 864, camera(s) 870, optical sensor controller 858, light source module 875 (see FIG. 8B), contact module 830, graphics module 832, and image management module 844, imaging module 843 includes executable instructions to capture still images or video (including a video stream) and store them into memory 802, modify characteristics of a still image or video, or delete a still image or video from memory 802.

In conjunction with touch screen 812, display controller 856, optical sensor(s) 864, camera(s) 870, contact module 830, graphics module 832, text input module 834, light source module 875 (see FIG. 8B), and imaging module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with RF circuitry 808, touch screen 812, display system controller 856, contact module 830, graphics module 832, text input module 834, e-mail client module 840, and browser module 847, calendar module 848 includes executable instructions to create, display, modify, and store calendars and data associated with calendars (e.g., calendar entries, to do lists, etc.) in accordance with user instructions.

In conjunction with RF circuitry 808, touch screen 812, display system controller 856, contact module 830, graphics module 832, text input module 834, and browser module 847, widget modules 849 are mini-applications that may be downloaded and used by a user (e.g., weather widget 849-1, stocks widget 849-2, calculator widget 849-3, alarm clock widget 849-4, and dictionary widget 849-5) or created by the user (e.g., user-created widget 849-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 808, touch screen 812, display system controller 856, contact module 830, graphics module 832, text input module 834, and browser module 847, the widget creator module 850 may be used by a user to create widgets (e.g., turning a user-specified portion of a web page into a widget).

In conjunction with touch screen 812, display system controller 856, contact module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact module 830, graphics module 832, audio circuitry 810, speaker 811, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player.

In conjunction with touch screen 812, display controller 856, contact module 830, graphics module 832, and text input module 834, notes module 853 includes executable instructions to create and manage notes, to do lists, and the like in accordance with user instructions.

In conjunction with RF circuitry 808, touch screen 812, display system controller 856, contact module 830, graphics module 832, text input module 834, GPS module 835, and browser module 847, map module 854 may be used to receive, display, modify, and store maps and data associated with maps (e.g., driving directions; data on stores and other points of interest at or near a particular location; and other location-based data) in accordance with user instructions.

In conjunction with touch screen 812, display system controller 856, contact module 830, graphics module 832, audio circuitry 810, speaker 811, RF circuitry 808, text input module 834, e-mail client module 840, and browser module 847, online video module 855 includes instructions that allow the user to access, browse, receive (e.g., by streaming and/or download), play back (e.g., on the touch screen or on an external, connected display via external port 824), send an e-mail with a link to a particular online video, and otherwise manage online videos in one or more file formats, such as H.264. In some embodiments, instant messaging module 841, rather than e-mail client module 840, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Example Computer System

Figure 9:
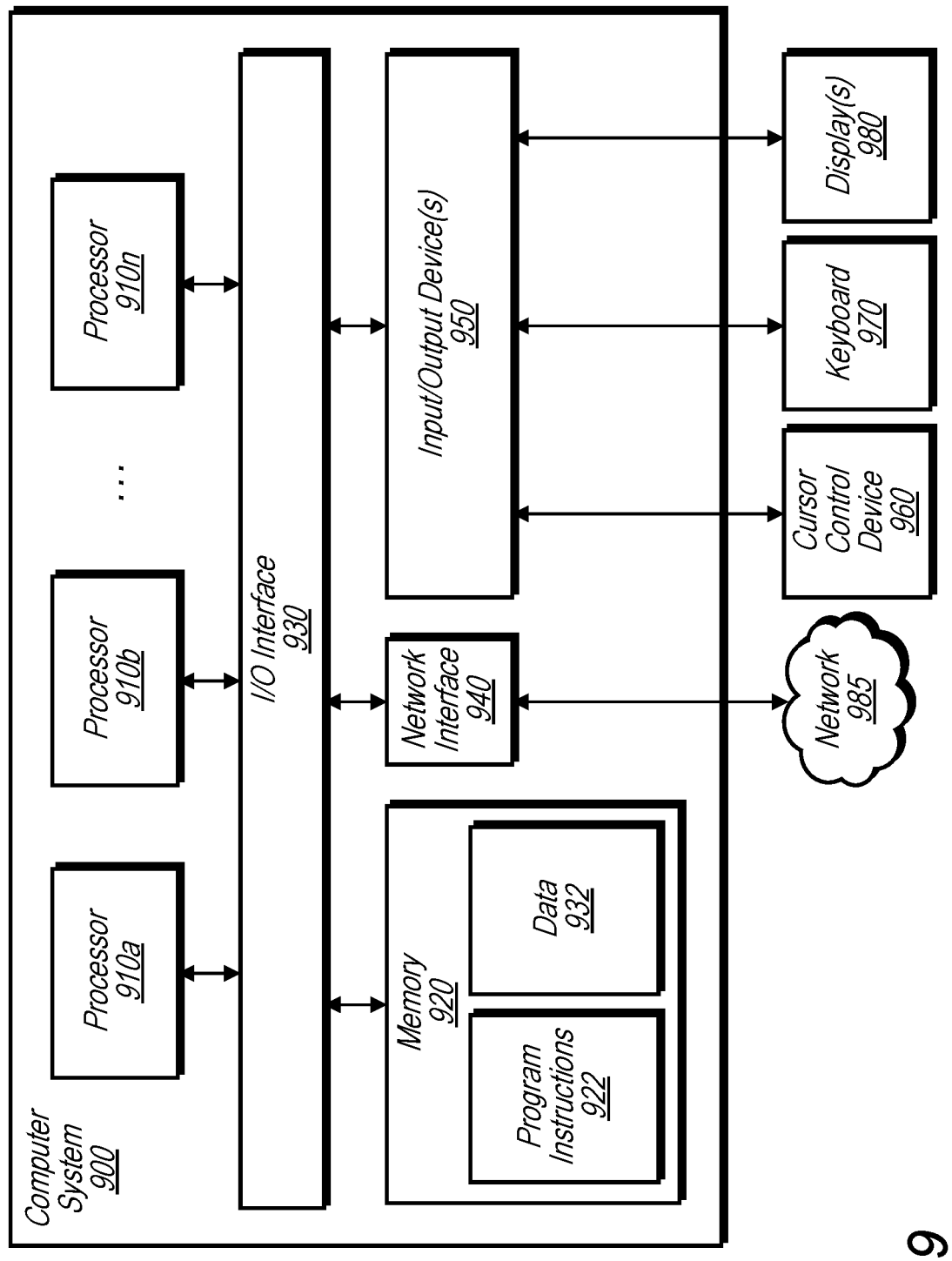
FIG. 9 illustrates an example computer system, according to some embodiments.

FIG. 9 illustrates an example computer system 900 that may include one or more camera modules, in accordance with some embodiments. In some embodiments, the computer system 900 may include one or multiple features, components, and/or implement functionality of embodiments described herein.

Various embodiments of a camera module, as described herein, may be executed in one or more computer systems 900, which may interact with various other devices. Note that any component, action, or functionality described above may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x8 18, PowerPC, SPARC, or MIPS ISAs, or any other suitable ISA. In multiprocessor systems, each of processors 910 may commonly, but not necessarily, implement the same ISA.

System memory 920 may be configured to store control program instructions 922 and/or control data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a control application incorporating any of the functionality described above. Additionally, existing control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera module, comprising:
a lens assembly having a particular optical design, the lens assembly including at least:
 a lens barrel; and
 multiple lens elements embedded within the lens barrel, wherein a change of temperature causes an optical focal shift that is determined according to a particular optical thermal shift rate associated with the particular optical design, wherein the particular optical thermal shift rate is within a range of 0.5 µm/° C. to 1.0 µm/° C.;
a lens holder having a lens holder coefficient of thermal expansion (CTE) to compensate for the optical focal shift by thermo-mechanical expansion, wherein:
 a first area of the lens holder is attached to the lens barrel using a lens attach adhesive; and
 the change of temperature causes a length expansion of the lens holder that is determined at least in part according to the lens holder CTE; and
an image sensor assembly that includes at least:
 an image sensor configured to capture light passing through the multiple lens elements of the lens assembly and to convert the captured light into image signals; and
 a substrate coupled to the image sensor,
wherein a second area of the lens holder is attached to the substrate using a holder attach adhesive.

2. The camera module of claim 1, wherein a total defocus rate is determined based on a difference between the particular optical thermal shift rate and a holder expansion rate of the lens holder, and wherein the total defocus rate satisfies an image quality performance metric.

3. The camera module of claim 2, wherein the image quality performance metric is a just-noticeable-defect (JND) metric associated with an unsatisfactory loss in image sharpness.

4. The camera module of claim 3, wherein the JND metric corresponds to a threshold defocus rate value within a range of 0.1 µm/° C. to 0.2 µm/° C., and wherein the total defocus rate satisfies the JND metric when the total defocus rate is less than the threshold defocus rate value.

5. The camera module of claim 1, wherein the lens holder CTE is within a range of 100 parts-per-million (ppm)/° C. to 140 ppm/° C., and wherein the lens holder has a water absorption property of less than 0.2 percent to provide satisfactory dimensional stability over moisture.

6. The camera module of claim 1, wherein the lens holder is a polybutylene terephthalate (PBT) material.

7. The camera module of claim 5, wherein:
the lens holder CTE is within a range of 100 parts-per-million (ppm)/° C. to 140 ppm/° C.; and
the lens barrel is a polycarbonate (PC) material, the lens barrel having a lens barrel CTE of about 70 ppm/° C.

8. The camera module of claim 7, wherein the lens attach adhesive corresponds to an epoxy material, the lens attach adhesive having:
a lens attach CTE within a range of 70 parts-per-million (ppm)/° C. to 100 ppm/° C.; and
an elastic modulus within a range of 2500 MPa to 3000 MPa.

9. The camera module of claim 5, wherein:
the lens holder CTE is within a range of 100 parts-per-million (ppm)/° C. to 140 ppm/° C.;
the substrate is an alumina ceramic material, the substrate having a substrate CTE of about 7 ppm/° C.; and
the holder attach adhesive corresponds to an epoxy material, the holder attach adhesive having:
 a holder attach CTE within a range of 150 parts-per-million (ppm)/° C. to 180 ppm/° C.; and
 an elastic modulus within a range of 300 MPa to 800 MPa.

10. The camera module of claim 1, wherein the lens holder is an alloy of a polycarbonate (PC) material and a polybutylene terephthalate (PBT) material.

11. The camera module of claim 1, wherein the lens holder is manufactured using an injection molding process that utilizes an injection mold with a symmetrical arrangement of multiple injection molding gates, the symmetrical arrangement designed to provide substantially similar resin flow through each of the gates for substantially isotropic material properties throughout the lens holder.

12. The camera module of claim 11, wherein the injection mold includes four sides, and wherein the multiple injection molding gates include one injection molding gate for each of the four sides.

13. A mobile device, comprising:
a camera module comprising:
 a lens assembly having a particular optical design, the lens assembly including at least:
  a lens barrel; and
  multiple lens elements embedded within the lens barrel,
  wherein a change of temperature causes an optical focal shift that is determined according to a particular optical thermal shift rate associated with the particular optical design;
 a lens holder having a lens holder coefficient of thermal expansion (CTE) to compensate for the optical focal shift by thermo-mechanical expansion, wherein:
  a first area of the lens holder is attached to the lens barrel using a lens attach adhesive; and
  the change in temperature causes a length expansion of the lens holder that is determined at least in part according to the lens holder CTE;
 an image sensor assembly that includes at least:
  an image sensor configured to capture light passing through the multiple lens elements and to convert the captured light into image signals; and
  a substrate coupled to the image sensor,
 wherein the lens holder is attached to the substrate using a holder attach adhesive;
wherein:
 a total defocus rate is determined based on a difference between the particular optical thermal shift rate and a holder expansion rate of the lens holder, and wherein the total defocus rate satisfies an image quality performance metric;
 the image quality performance metric is a just-noticeable-defect (JND) metric associated with an unsatisfactory loss in image sharpness;
 the JND metric corresponds to a threshold defocus rate value within a range of 0.1 µm/° C. to 0.2 µm/° C.; and the total defocus rate satisfies the JND metric when the total defocus rate is less than the threshold defocus rate value;

a display; and one or more processors configured to cause the display to present an image based at least in part on one or more of the image signals from the image sensor.

14. The mobile device of claim 13, wherein the display is located on a front side of the mobile device, and wherein the camera module is a fixed focus rear camera located on a rear side of the mobile device opposite the front side.

15. An article of manufacture, comprising:

a lens assembly having a particular optical design, the lens assembly including at least:

a lens barrel; and multiple lens elements embedded within the lens barrel and having an optical axis, wherein a change of temperature causes an optical focal shift that is determined according to a particular optical thermal shift rate associated with the particular optical design; and a lens holder having a lens holder coefficient of thermal expansion (CTE) to compensate for the optical focal shift by thermo-mechanical expansion, wherein the lens holder CTE is within a range of 100 parts-per-million (ppm)/° C. to 140 ppm/° C., and wherein:

a first area of the lens holder is attached to the lens barrel using a lens attach adhesive that comprises a first epoxy material having a lens attach CTE within a range of 70 parts-per-million (ppm)/° C. to 100 ppm/° C.; and the change of temperature causes a length expansion of the lens holder that is determined at least in part according to the lens holder CTE.

16. The article of manufacture of claim 15, wherein:

the lens holder is a polybutylene terephthalate (PBT) material;

the lens barrel is a polycarbonate (PC) material, the lens barrel having a lens barrel CTE of about 70 ppm/° C.; and the lens attach adhesive has an elastic modulus within a range of 2500 MPa to 3000 MPa.

17. The article of manufacture of claim 16, wherein:

the substrate is an alumina ceramic material, the substrate having a substrate CTE of about 7 ppm/° C.; and the holder attach adhesive corresponds to a second epoxy material, the holder attach adhesive having:

a holder attach CTE within a range of 150 parts-per-million (ppm)/° C. to 180 ppm/° C.; and an elastic modulus within a range of 300 MPa to 800 MPa.

\* \* \* \* \*